UNITED STATES PATENT OFFICE.

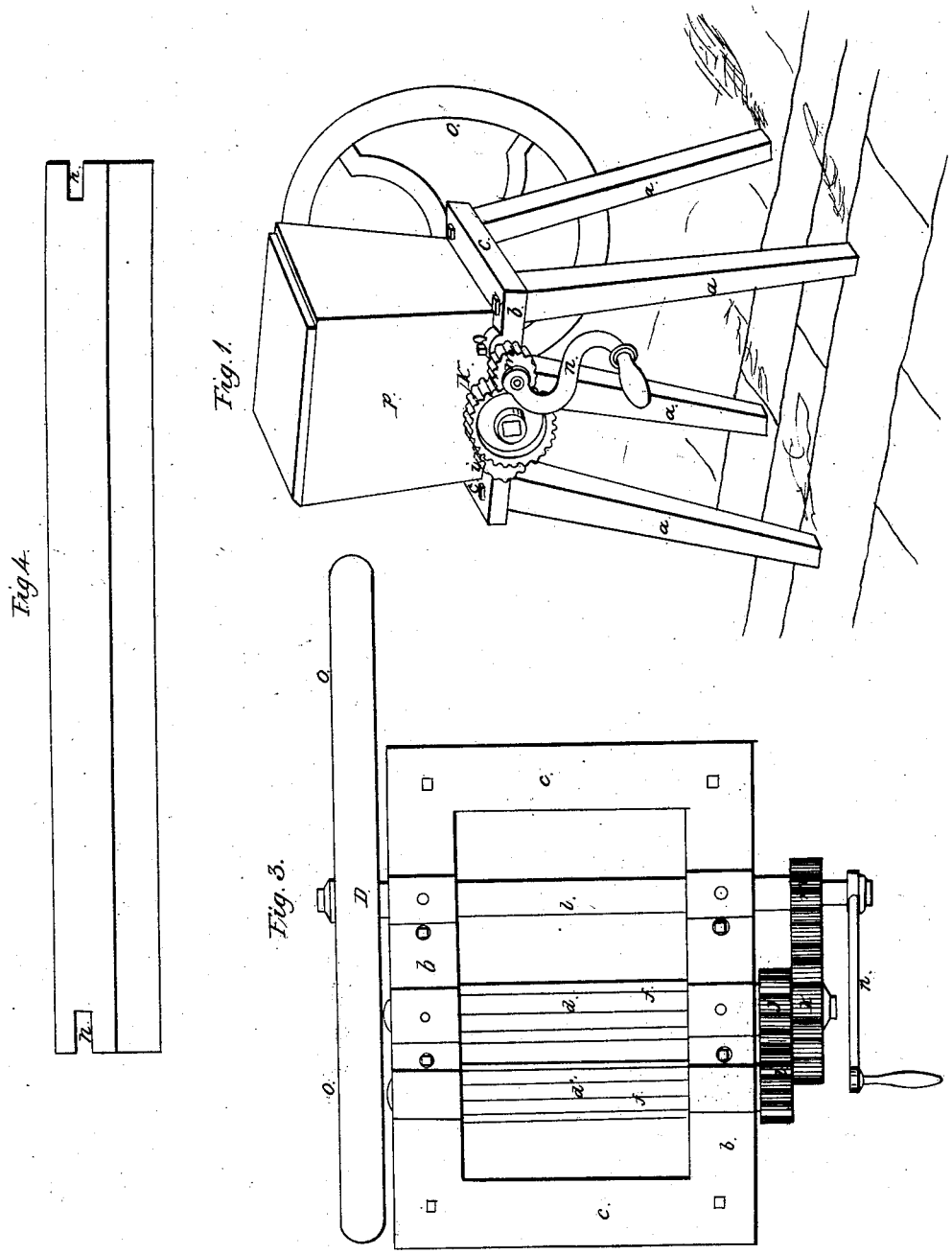

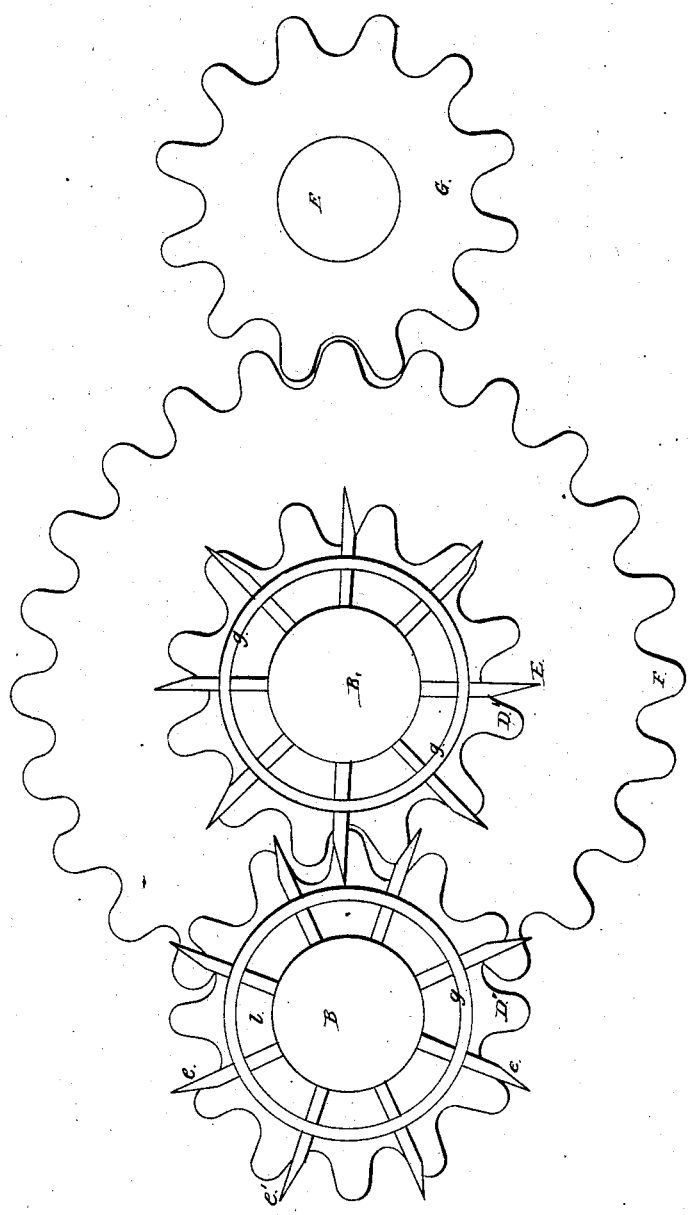

JOHN BOYNTON, OF SOUTH COVENTRY, CONNECTICUT.

MACHINE FOR CUTTING STRAW, HAY, RAGS, AND OTHER SUBSTANCES.

Specification of Letters Patent No. 1,017, dated November 25, 1838.

*To all whom it may concern:*

Be it known that I, JOHN BOYNTON, of South Coventry, in the county of Tolland and State of Connecticut, have invented a new and useful Improvement in Machines for Cutting Straw, Hay, Rags, and other Substances; and I do hereby declare that the following is a full and exact description thereof, reference being had to the annexed drawings, which make part of this specification.

The nature of my invention consists in cutting straw, hay, &c., by the action of knives set longitudinally in two cylinders revolving in contrary directions toward each other; the knives passing each other in the operation.

Figure 1 of the drawings is a perspective view of the machine; Fig. 2, a section through the cylinders. Fig. 3, a top view of the machine with the hopper off. Fig. 4 shows the form of the knives.

$a, a$, Fig. 1 represent the standards or legs upon which the frame rests and to which it is attached in any suitable manner. These may if desired be dispensed with in which case the frame may rest upon and be attached to any suitable platform with the necessary arrangement of a slot for the balance wheel to work in and an aperture for the feed to pass through.

$b, b$, Figs. 1 and 3 are the longitudinal pieces of the frame, $c\ c$ the transverse pieces which are firmly united at their ends and are of convenient size and strength.

$d$ and $d'$ Figs. 2 and 3 are two cylinders which revolve in suitable boxes connected to the longitudinal pieces of the frame near the center. To these cylinders any suitable number of knives Fig. 4, and $e$, Fig. 2 are attached by being inserted into grooves $f$, Fig. 3 and a ring $g$, Fig. 2 driven on to the ends of the cylinder, and into slots $h$ Fig. 4 made in the end of the knives for that purpose.

These knives project so far beyond the surface of the cylinder as to came as near the periphery of the one opposite as possible and not touch, and are so geared by the pinion that the knives of the one pass by, and at a semi distance between the knives of the other thereby serving to draw in the material to be cut and superceding the necessity of a feeder.

The cylinder $d'$ projects at one end beyond the longitudinal piece sufficiently to receive a pinion $i$ Figs. 1 and 3 on its axle, and $d$ projects so much as to receive a pinion $j$, and a gear wheel $k$, of double the size of the pinion. A shaft $l$, Fig. 3, then revolves in suitable boxes connected to the longitudinal pieces at a suitable distance from the cylinders $d$ and $d'$ and parallel with them to one end of which is attached a driving pinion $m$ Figs. 1 and 3 of the same size of the pinions $i$ and $j$, which gears into the gear wheel $k$. A crank $n$ Figs. 1 and 3 may then be attached to this end of the shaft or motion may be communicated by any known motive power.

$o$, Figs. 1 and 3 is a balance wheel of convenient size and weight attached to the opposite end of said shaft which performs the office of the ordinary balance wheel.

The material to be cut is placed into a box or hopper $p$, Fig. 1, of a convenient and suitable size and form, which rests upon the frame and requires the material to be fed perpendicularly.

What I claim as my invention and desire to secure by Letters Patent is—

The method of cutting straw, hay, rags, and other substances with two sets of knives set in two distinct cylinders, which in the revolution of the cylinders shall pass by each other, the one coming nearly up to the periphery of the cylinder opposite, in the manner before described.

JOHN BOYNTON.

Witnesses:
CALVIN MANNING,
ANN M. ROSE.